United States Patent
Ohtsuka et al.

(10) Patent No.: US 10,212,345 B2
(45) Date of Patent: Feb. 19, 2019

(54) IMAGING APPARATUS INCLUDING A FUNCTION SETTING UNIT FOR ACHIEVING DIFFERENT FUNCTIONS DEPENDING ON THE PHOTOGRAPHIC MODE

(71) Applicant: Panasonic Intellectual Property Management Co., Ltd., Osaka (JP)

(72) Inventors: Yoshio Ohtsuka, Osaka (JP); Hiroki Kasugai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/784,170

(22) Filed: Oct. 15, 2017

(65) Prior Publication Data

US 2018/0278841 A1    Sep. 27, 2018

(30) Foreign Application Priority Data

Mar. 27, 2017   (JP) .................................. 2017-061039
Jul. 20, 2017   (JP) .................................. 2017-140520

(51) Int. Cl.
    *H04N 5/225*         (2006.01)
    *H04N 5/232*         (2006.01)
    (Continued)

(52) U.S. Cl.
    CPC ....... *H04N 5/23245* (2013.01); *G03B 17/566* (2013.01); *H04N 5/23216* (2013.01); *H04N 5/772* (2013.01)

(58) Field of Classification Search
    CPC ........................ H04N 5/23216; H04N 5/23245
    (Continued)

(56) References Cited

U.S. PATENT DOCUMENTS

2009/0290035 A1* 11/2009 Hosoda .................. H04N 5/232
                                                      348/220.1
2010/0079589 A1* 4/2010 Yoshida ................. H04N 5/232
                                                         348/81

FOREIGN PATENT DOCUMENTS

| JP | 2004-207899 A | 7/2004 |
| JP | 2009-094663 A | 4/2009 |
| JP | 2016-051957 A | 4/2016 |

OTHER PUBLICATIONS

The Extended European Search Report dated Mar. 22, 2018 for the related European Patent Application No. 17196141.0.

(Continued)

*Primary Examiner* — Usman A Khan
(74) *Attorney, Agent, or Firm* — Renner Otto Boisselle & Sklar, LLP

(57) ABSTRACT

A digital camera includes common terminal 12, mode dial 10, and function setting unit 140. Mode dial 10 is capable of setting a certain photography mode from among a plurality of photography modes including a moving image photography mode and a still image photography mode. Function setting unit 140 performs a setting so as to, when mode dial 10 sets the certain photography mode to the moving image photography mode, achieve a first function using common terminal 12, and, when mode dial 10 sets the certain photography mode to the still image photography mode, achieve a second function using common terminal 12. Function setting unit 140 does not achieve the second function in the moving image photography mode, and does not achieve the first function in the still image photography mode.

5 Claims, 6 Drawing Sheets

(51) Int. Cl.
*G03B 17/56* (2006.01)
*H04N 5/77* (2006.01)

(58) Field of Classification Search
USPC ...................................................... 348/220.1
See application file for complete search history.

(56) References Cited

OTHER PUBLICATIONS

Alexander Fagot: "Computex 2016 Eye-Plug: 3D Add-on for Smartphones with USB-C port", Jun. 1, 2016 (Jun. 1, 2016), XP055458751, Retrieved from the Internet: URL:https://www.notebookcheck.com/Eye-Plug-3D-Addon-fuer-Smartphones-mit-USB-C-Port.167071.0.html [retrieved on Mar. 13, 2018].

Anonymous: "FLIR announces third-gen FLIR One smartphone thermal camera with USB Type-C, plus drone thermal cameras", Jan. 4, 2017 (Jan. 4, 2017), XP055458755, Retrieved from the Internet: URL:https://www.androidpolice.com/2017/01/04/flir-announces-third-gen-flir-one-smartphone-thermal-camera-usb-type-c-plus-drone-thermal-cameras/ [retrieved on Mar. 13, 2018].

Anwar Sadat et al: "Alternate Mode for USB Type-C: Going beyond USB", Oct. 21, 2016 (Oct. 21, 2016), XP055459059, Retrieved from the Internet: URL:http://www.ti.com/lit/wp/slly021/slly021.pdf [retrieved on Mar. 13, 2018].

\* cited by examiner

FIG. 5

| PHOTOGRAPHY MODE | FUNCTION | TERMINAL |
|---|---|---|
| MOVING IMAGE PHOTOGRAPHY MODE | INPUT OR OUTPUT OF TIME CODE SIGNAL | TC-IN TERMINAL OR TC-OUT TERMINAL |
| STILL IMAGE PHOTOGRAPHY MODE | OUTPUT OF ELECTRONIC FLASH EMITTING TIMING | ELECTRONIC FLASH SYNCHRONIZATION TERMINAL |

IMAGING APPARATUS INCLUDING A FUNCTION SETTING UNIT FOR ACHIEVING DIFFERENT FUNCTIONS DEPENDING ON THE PHOTOGRAPHIC MODE

BACKGROUND

1. Technical Field

The present disclosure relates to an imaging apparatus for achieving a function of each of a plurality of photography modes using a common terminal.

2. Description of the Related Art

A terminal sharing technique has been widely known for sharing a terminal to reduce a number of parts (e.g., see PTL 1).

PTL 1 discloses an imaging apparatus that uses a single common connector for connecting an external device.

CITATION LIST

Patent Literature

PTL 1: Unexamined Japanese Patent Publication No. 2009-94663

SUMMARY

The present disclosure is an imaging apparatus including a common terminal, a photography mode setting unit, and a function setting unit. The photography mode setting unit is capable of setting a certain photography mode from among a plurality of photography modes including a first photography mode and a second photography mode. The function setting unit is configured, when the photography mode setting unit sets the certain photography mode to the first photography mode, to achieve a first function using the common terminal, but to not achieve a second function. The function setting unit is also configured, when the photography mode setting unit sets the certain photography mode to the second photography mode, to achieve the second function using the common terminal, but to not achieve the first function.

With the imaging apparatus according to the present disclosure, a function used in each of a plurality of photography modes can be achieved by using a common terminal.

BRIEF DESCRIPTION OF THE DRAWINGS

FIG. 5 is a table illustrating allocation of the common terminal by photography mode.

DETAILED DESCRIPTION

Hereinafter, exemplary embodiments will be described in detail with reference to the drawings appropriately. However, descriptions in more detail than necessary may be omitted. For example, a detailed description of a matter which is already well-known and a repeated description for a substantially identical configuration may be omitted. This is intended to prevent the following description from becoming unnecessarily redundant and to facilitate understanding by those skilled in the art.

Here, the inventors provide the attached drawings and the following description such that those skilled in the art can sufficiently understand the present disclosure, and therefore, they do not intend to restrict the subject matters of claims.

First Exemplary Embodiment

A first exemplary embodiment will now be described herein with reference to the drawings. The first exemplary embodiment describes a digital camera as an example imaging apparatus. The digital camera can connect an electronic flash as an external device. Conventionally, some digital cameras are often disposed with a so-called electronic flash synchronization terminal (SYNC terminal) for connecting an electronic flash. In this exemplary embodiment, such an electronic flash synchronization terminal can be used as a terminal for another device, such as a time code (TC) terminal, in a photography mode (e.g., a moving image photography mode) with which no electronic flash is used. In other words, in the photography mode (e.g., the moving image photography mode) with which no electronic flash is used, the electronic flash synchronization terminal may be connected with another external device than an electronic flash, such as a TC-related device (a TC generator or an imaging apparatus).

The electronic flash synchronization terminal is a terminal for outputting a signal of an electronic flash emitting timing. The electronic flash synchronization terminal corresponds to a trigger signal output terminal according to the present disclosure. The TC terminal is a terminal for outputting or inputting a time code signal. The time code signal is a signal for associating images photographed by a plurality of imaging apparatuses with times of photography. The digital camera synchronizes with the TC generator or another imaging apparatus based on the time code signal. Times when images are photographed by the plurality of imaging apparatuses can therefore be paired.

1-1. Appearance

Figure 1A:
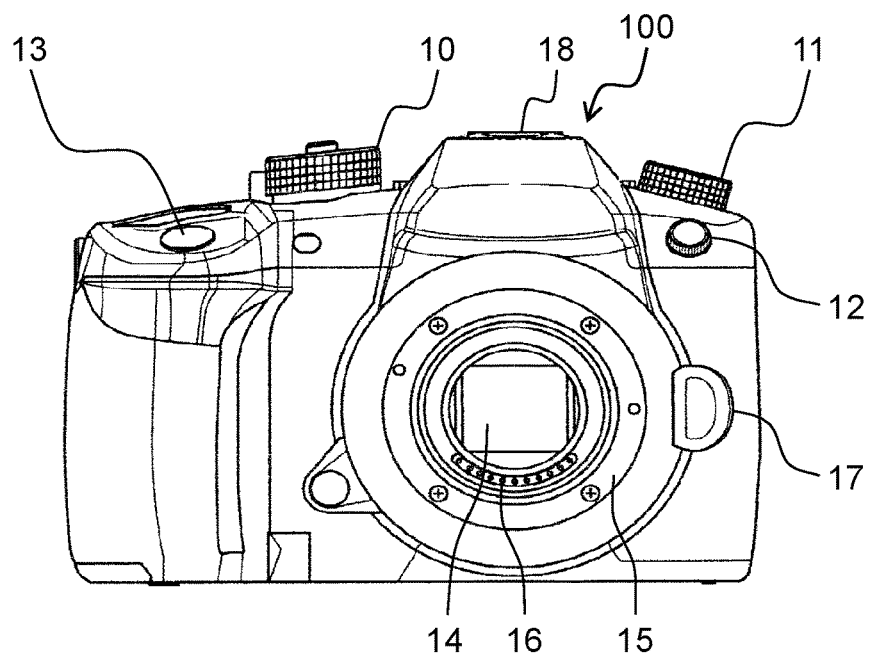
FIG. 1A is an external view of a digital camera according to a first exemplary embodiment.
Figure 1B:
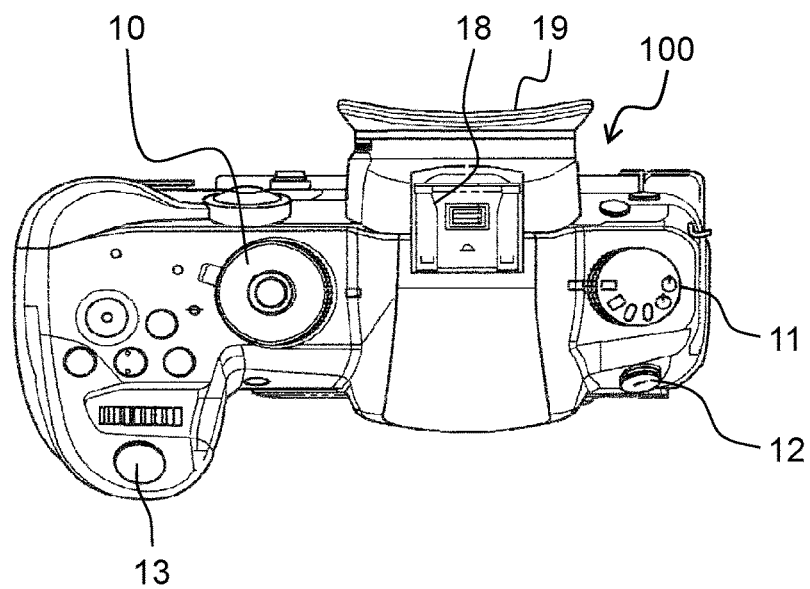
FIG. 1B is an external view of the digital camera according to the first exemplary embodiment.

FIGS. 1A and 1B are external views of the digital camera according to the first exemplary embodiment. FIG. 1A is a front view, and FIG. 1B is a top view.

Digital camera 100 according to this exemplary embodiment is a lens interchangeable digital camera with which a user is able to attach various types of interchangeable lenses to mount 15 to enjoy photography. An inner circumference of mount 15 is partially provided with a plurality of electric contacts 16 arranged in an arc shape. Upon an interchangeable lens is attached to mount 15, the digital camera and the interchangeable lens can communicate each other via electric contacts 16. Digital camera 100 obtains from the interchangeable lens information unique to the interchangeable lens, as well as controls operation of the interchangeable lens in accordance with a photography condition. By rotating the interchangeable lens while lens removal button 17 is pressed, the interchangeable lens can be removed from mount 15.

Digital camera 100 is not a so-called single lens reflex digital camera. Digital camera 100 does not therefore include a movable mirror for switching incident light from an interchangeable lens to either an imaging device or an optical viewfinder. A subject of digital camera 100 can therefore directly view imaging device 14 formed by a complementary metal oxide semiconductor (CMOS) image sensor in mount 15. On a front face of imaging device 14, an ultrasonic filter for removing adhered dirt and dust and an optical low-pass filter for removing a high frequency component in incident light are disposed.

On an upper face of digital camera 100, operation members are disposed, including shutter button 13 for instructing photography, mode dial 10 (a photography mode setting unit) for performing various settings relating to photography, and drive mode dial 11. A user can select a certain mode by using mode dial 10, drive mode dial 11, and other operation members. Specifically, the user can select, using mode dial 10, a certain photography mode from among a program auto exposure (AE) mode with which a photograph is taken at a diaphragm value and a shutter speed determined by digital camera 100, a diaphragm priority AE mode with which a photograph is taken at a diaphragm value determined by the user, a shutter speed priority AE mode with which a photograph is taken at a shutter speed determined by the user, a manual exposure mode with which a photograph is taken at a diaphragm value and a shutter speed determined by the user, and a creative moving image mode with which a moving image is taken at a diaphragm value and a shutter speed determined by the user. The user can also select, using drive mode dial 11, another mode such as a single shooting mode, a continuous shooting mode, and an auto bracket mode.

On the upper face of the digital camera, hot shoe 18 is also provided so that an external electronic flash device having a greater luminescence amount can be attached, for example. A hot shoe cover is attached before hot shoe 18 is used.

On an inclined portion of the upper face of digital camera 100, common terminal 12 is provided for use as a time code (TC)-IN terminal, a TC-OUT terminal, or an electronic flash synchronization terminal in accordance with a photography mode. The TC-IN terminal corresponds to a synchronizing signal input terminal according to the present disclosure. The TC-OUT terminal corresponds to a synchronizing signal output terminal according to the present disclosure. When common terminal 12 is not in use, a cap is attached to common terminal 12.

When common terminal 12 is used as the electronic flash synchronization terminal, digital camera 100 and an electronic flash are connected via a synchronization cable attached to common terminal 12. The electronic flash can therefore emit light in synchronization with pressing of shutter button 13.

When common terminal 12 is used as the TC-IN terminal or the TC-OUT terminal, digital camera 100 and a TC-related device are connected via a SYNC-BNC converting coaxial cable attached to common terminal 12. The TC-related device may be a TC generator, or another imaging apparatus, for example. The SYNC-BNC converting coaxial cable is a cable for fitting an interface conforming to a Japanese Industrial Standards (JIS) standard relating to electronic flash synchronization terminals to an interface conforming to a JIS-standard relating to TC-IN terminals or TC-OUT terminals. The JIS-standard relating to electronic flash synchronization terminals is specified in JISB7101 or JISB7102. The JIS-standard relating to TC-IN terminals or TC-OUT terminals is specified in JISC5412.

When common terminal 12 is used as the TC-IN terminal, an external synchronizing signal (time code signal) can be input into common terminal 12. An image photographed by digital camera 100 can be synchronized with a received external synchronizing signal. One digital camera 100 or a plurality of digital cameras 100 can therefore use as a reference signal a time code signal of a main device such as a TC generator to synchronize with a photographed image each other.

When common terminal 12 is used as the TC-OUT terminal, an external synchronizing signal (time code signal) can be output from common terminal 12. Images photographed by other digital cameras 100 can be synchronized with output external synchronizing signals. In other words, the plurality of digital cameras 100 can each use as a reference signal the time code signal to synchronize with each photographed image each other. The time code signal is a digital signal having a period identical to a moving image frame period, for example, and its content is specified as a format including a plurality of pieces of information such as an "hour," a "minute," a "second," and a "number of frames."

On a back face of digital camera 100, a movable monitor is disposed. For the movable monitor, a flat display such as a liquid crystal monitor is adopted. The movable monitor displays an image formed in imaging device 14 based on incident light.

In addition to the movable monitor, digital camera 100 includes electronic viewfinder 19. On the back face of digital camera 100, various operation members such as operation buttons including a cross-key and operation dials are disposed. With these operation members, a user is able to set details on photography, replay, and other actions. On a left side when viewed from the front face of the digital camera, a slot is provided, into which a memory card can be inserted. This slot is hidden by a cover.

1-2. Configuration 1-2-1. Entire Configuration

Figure 2:
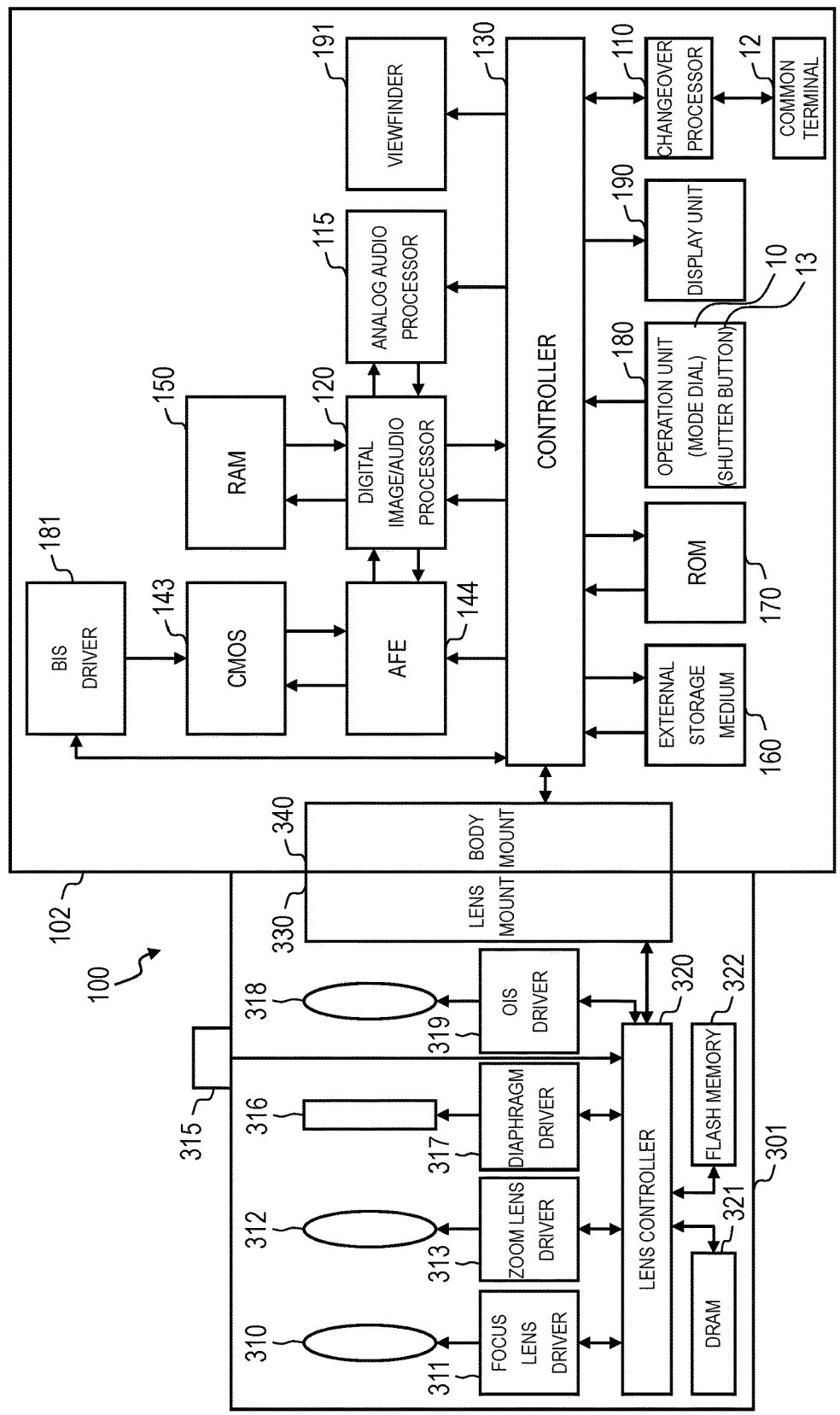
FIG. 2 is a view illustrating a configuration of the digital camera according to the first exemplary embodiment.

FIG. 2 is a view illustrating a configuration of digital camera 100 according to the first exemplary embodiment. Digital camera 100 images a subject and generates image data (still image, moving image) to record the image data on a recording medium. Digital camera 100 includes camera body 102, and interchangeable lens 301 attached to camera body 102. Digital camera 100 receives audio during taking a moving image, and can record audio data as well as the image data on the recording medium.

1-2-2. Configuration of Interchangeable Lens

Interchangeable lens 301 has an optical system including focus lens 310, correcting lens 318, and zoom lens 312. Interchangeable lens 301 further includes lens controller 320, lens mount 330, focus lens driver 311, zoom lens driver 313, diaphragm 316, diaphragm driver 317, operation ring 315, optical image stabilizer (OIS) driver 319, dynamic random access memory (DRAM) 321, flash memory 322, and the like.

Lens controller 320 controls entire operation of interchangeable lens 301. Lens controller 320 accepts an operation of operation ring 315 performed by a user, and can control zoom lens driver 313 such that zoom lens 312 is driven. Lens controller 320 can control focus lens driver 311, OIS driver 319, and diaphragm driver 317 such that focus lens 310, correcting lens 318, and diaphragm 316 are driven.

OIS driver 319 includes a drive mechanism configured with, for example, a magnet and a planar coil. OIS driver 319 controls the drive mechanism based on a detection signal of a gyro sensor that detects unsteadiness of interchangeable lens 301, and shifts correcting lens 318 in a plane vertical to an optical axis of the optical system in accordance with the unsteadiness of interchangeable lens 301. As a result, an influence of unsteadiness caused by camera shake in a picked up image can be reduced.

Lens controller 320 is connected to DRAM 321 and flash memory 322, and writes or reads information in or from these memories as necessary. Further, lens controller 320 can communicate with controller 130 via lens mount 330. Lens controller 320 may be configured with a hard-wired electronic circuit, or a microcomputer using a program, for example.

Lens mount 330 is connected to body mount 340 of camera body 102, and mechanically and electrically connects interchangeable lens 301 with camera body 102. When interchangeable lens 301 is connected with camera body 102, lens controller 320 and controller 130 can communicate with each other. Body mount 340 corresponds to mount 15 shown in FIG. 1A, and can transmit a signal received from lens controller 320 via lens mount 330 to controller 130 of camera body 102.

1-2-3. Configuration of Camera Body

Camera body 102 includes CMOS image sensor 143 and analog front end (AFE) 144.

CMOS image sensor 143 corresponds to imaging device 14 shown in FIG. 1A, and picks up a subject image formed through interchangeable lens 301 to generate image information. As an image sensor, another type of image sensor (e.g., charge coupled device (CCD) image sensor) may be used.

With respect to image information read from CMOS image sensor 143, AFE 144 suppresses a noise through correlated double sampling, causes an analog gain controller to perform amplification to an input range width for an analog/digital (A/D) converter, and causes the A/D converter to perform A/D conversion.

Analog audio processor 115 executes a predetermined signal process on the analog audio signals. Analog audio processor 115 converts the processed analog audio signals into digital audio signals through the A/D converter, and outputs the digital audio signals to digital image/audio processor 120. Analog audio processor 115 is one example of an audio signal processor. Analog audio processor 115 is configured with an electronic circuit including an analog circuit, namely, one or a plurality of semiconductor integrated circuit(s). Analog audio processor 115 has an automatic level control (ALC) function. The automatic level control function is for automatically adjusting a gain such that a level of a digital audio signal to be output does not exceed a predetermined upper limit threshold regardless of a level of a received analog audio signal.

Digital image/audio processor 120 executes various processes on image information output from AFE 144 and an audio signal output from analog audio processor 115. For example, digital image/audio processor 120 performs gamma correction, white balance correction, flaw correction, a coding process, and the like on the image information in accordance with an instruction from controller 130. Further, digital image/audio processor 120 executes various processes on the audio signals in accordance with the instruction from controller 130. Digital image/audio processor 120 may be achieved by a hard-wired electronic circuit, or a microcomputer that executes a program, for example.

Digital image/audio processor 120 may be achieved as one semiconductor chip integrally with controller 130 or the like. For example, digital image/audio processor 120 can be configured with a device, such as a central processing unit (CPU), a field-programmable gate array (FPGA), an application specific integrated circuit (ASIC), a digital signal processor (DSP), or the like.

Digital image/audio processor 120 performs a computing process on an audio signal output from an audio input unit, and performs a directivity synthesis process and a noise suppressing process. A circuit that achieves digital image/audio processor 120 may be integrated into one or a plurality of semiconductor integrated circuit(s).

Display unit 190 is disposed on the back face of digital camera 100. Display unit 190 can be configured with a liquid crystal display or an organic electro luminescence (EL) display. Display unit 190 displays an image based on the image information processed by digital image/audio processor 120.

Controller 130 integrally controls entire operation of digital camera 100. Controller 130 may be achieved by a hard-wired electronic circuit, or a microcomputer that executes a program, for example. Further, controller 130 may be achieved as one semiconductor chip integrally with digital image/audio processor 120. Further, read only memory (ROM) 170 does not have to be present outside controller 130 (as a member separated from controller 130), and may be incorporated in controller 130. For example, controller 130 can be configured with a CPU, an FPGA, an ASIC, or a DSP.

ROM 170 stores programs relating to automatic focus control (AF control), automatic exposure control (AE control), and electronic flash emission control to be made by controller 130, as wells as programs for generally controlling the entire operation of digital camera 100. ROM 170 stores various conditions and settings relating to digital camera 100. In the first exemplary embodiment, ROM 170 is a flash ROM.

Random access memory (RAM) 150 functions as work memories of digital image/audio processor 120 and controller 130. RAM 150 can be achieved by a synchronous dynamic random access memory (SDRAM) or a flash memory, for example. RAM 150 functions also as an internal memory in which image information, an audio signal, and other data are recorded.

External storage medium 160 is a memory device containing a nonvolatile storage cell such as a flash memory therein. External storage medium 160 is detachable from camera body 102. External storage medium 160 records image data and audio data to be processed by digital image/audio processor 120 in accordance with control of controller 130.

Operation unit 180 is a general term of an operation interface such as an operation button and an operation dial disposed on an exterior of digital camera 100. Operation unit 180 accepts an operation to be performed by a user. For example, operation unit 180 includes at least one of shutter button 13, a power switch, mode dial 10, and drive mode dial 11, which are provided to the upper face of digital camera 100, as well as a center button, a cross button, and touch panel 20, which are provided to the back face of digital camera 100. When operation unit 180 receives an operation performed by a user, operation unit 180 informs controller 130 of various operation instruction signals. Touch panel 20 corresponds to an input unit according to the present disclosure. In this exemplary embodiment, touch panel 20 is disposed integrally with display unit 190.

Common terminal 12 exchanges various signals with controller 130 via changeover processor 110.

Changeover processor 110 switches a photography mode. Changeover processor 110 will be described later in detail.

Further, camera body 102 shifts CMOS image sensor 143 in accordance with unsteadiness of camera body 102, and therefore reduces an influence of unsteadiness caused by camera shake in a picked up image. As a configuration that achieves this function, camera body 102 includes body image stabilizer (BIS) driver 181 that moves CMOS image sensor 143 based on the unsteadiness of camera body 102. BIS driver 181 includes a drive mechanism that is configured with, for example, a magnet and a planar coil. BIS driver 181 controls the drive mechanism based on signals from the gyro sensor and a position sensor, and shifts CMOS image sensor 143 in a plane vertical to the optical axis such that the unsteadiness of camera body 102 is canceled.

1-2-4. Configuration of Changeover Processor and Other Devices

Figure 3A:
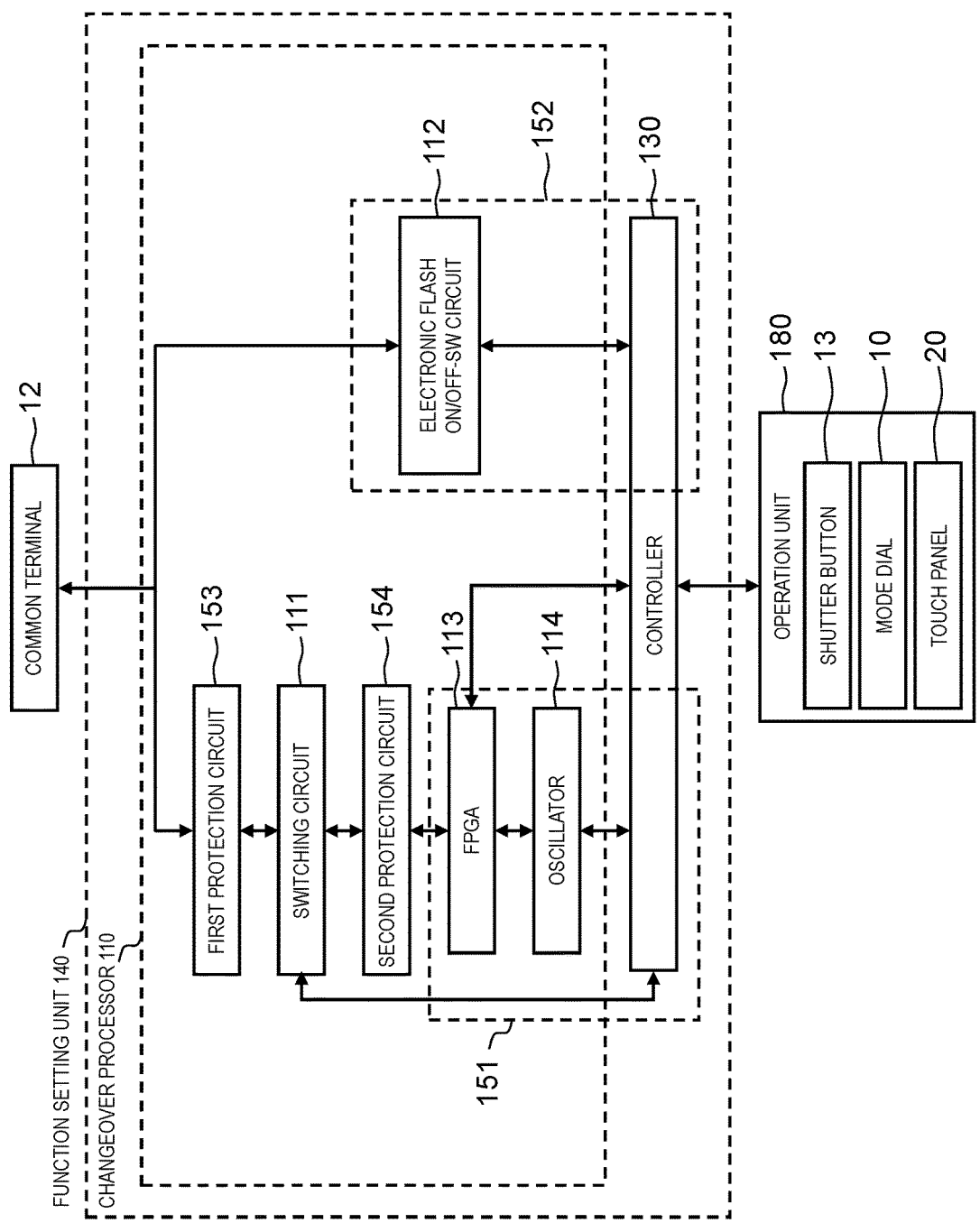
FIG. 3A is a block diagram illustrating an electrical configuration of main units including a changeover processor.
Figure 3B:
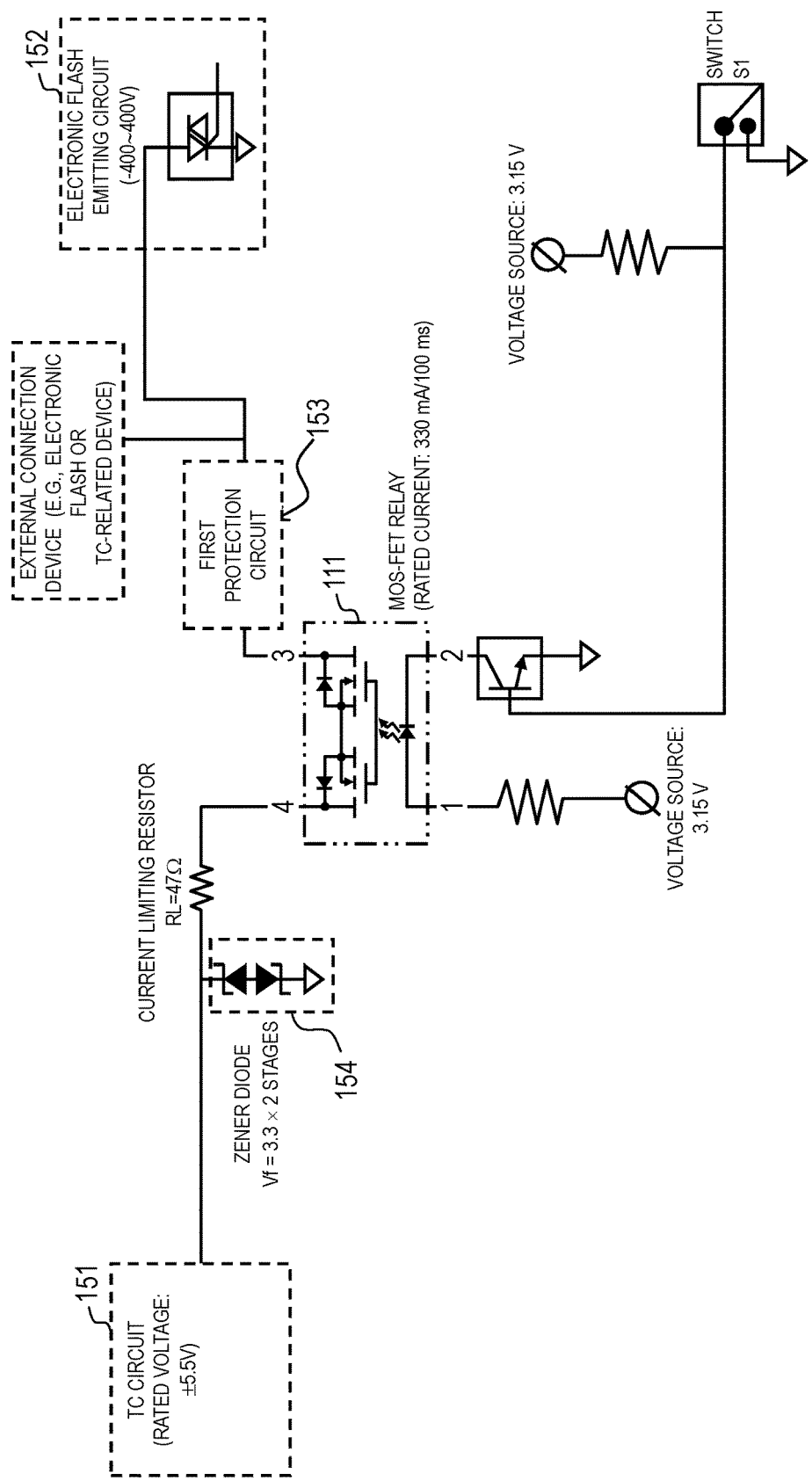
FIG. 3B is a circuit diagram of the main units including the changeover processor.

FIG. 3A is a block diagram illustrating an electrical configuration of main units including changeover processor 110. FIG. 3B is a circuit diagram of the main units including changeover processor 110.

Function setting unit 140 shown in FIG. 3A includes changeover processor 110 and controller 130. Function setting unit 140 includes TC circuit 151 served as a first circuit, electronic flash emitting circuit 152 served as a second circuit, switching circuit 111, first protection circuit 153, and second protection circuit 154.

TC circuit 151 is connected to common terminal 12 to achieve a first function of inputting or outputting of a time code signal. TC circuit 151 includes field-programmable gate array (FPGA) 113, oscillator 114, and controller 130.

Controller 130 drives a clock disposed in digital camera 100 based on a clock signal output from oscillator 114. Controller 130 can also increase or decrease a frequency of a clock signal to be output from oscillator 114, as well as can adjust precision of a clock signal. Controller 130 is not able to output the time code signal itself. FPGA 113 encodes a signal to be output from controller 130 in a form specified as the time code signal. Controller 130 is not able to read the time code signal as is. FPGA 113 decodes the time code signal in a form with which controller 130 can read.

Oscillator 114 outputs a signal (clock signal) having a predetermined frequency based on a condition set by controller 130 beforehand. An output signal of oscillator 114 provides, for example, information used for determining a time condition and a synchronization condition required when controller 130 and FPGA 113 record a moving image. If controller 130 or FPGA 113 is not able to accept the output signal of oscillator 114 as is, a phase locked loop (PLL) may be disposed between oscillator 114 and controller 130, or between oscillator 114 and FPGA 113.

Electronic flash emitting circuit 152 is connected to common terminal 12 to achieve a second function. The second function is, for example, a function of outputting a signal triggering an electronic flash to emit light. Electronic flash emitting circuit 152 includes electronic flash ON/OFF-SW circuit 112 and controller 130.

Electronic flash ON/OFF-SW circuit 112 may be achieved by a switching element such as a metal oxide silicon field effect transistor (MOS-FET) or a transistor, however, in this exemplary embodiment, refers to a circuit having an impedance designed such that ON/OFF switching of a connection can be achieved. Specifically, electronic flash ON/OFF-SW circuit 112 is set so as to have a fully higher impedance while a shutter button (shutter button 13 shown in FIGS. 1A and 1B) is not pressed. While the shutter button is not pressed, a connection between electronic flash emitting circuit 152 and common terminal 12 is therefore turned OFF. On the other hand, electronic flash ON/OFF-SW circuit 112 is set to have a lower impedance while the shutter button is pressed. Upon the shutter button is pressed, the connection between electronic flash emitting circuit 152 and common terminal 12 is therefore turned ON in accordance with a connection state of switching circuit 111. Specifically, when switching circuit 111 is turned OFF, electronic flash ON/OFF-SW circuit 112 and common terminal 12 conduct each other. When switching circuit 111 is turned ON, electronic flash ON/OFF-SW circuit 112 and common terminal 12 do not conduct each other.

Switching circuit 111 is a changeover circuit for performing ON/OFF switching of the connection between common terminal 12 and TC circuit 151. Switching circuit 111 is, specifically, as shown in FIG. 3B, a MOS-FET relay circuit.

First protection circuit 153 is connected between common terminal 12 and switching circuit 111. First protection circuit 153 corresponds to a protection circuit according to the present disclosure. First protection circuit 153 is, specifically, an RLC filter (RLC stands for resistor (R), inductor (L), and capacitor (C)) in which a resistor, a coil, and a capacitor are connected in series. The capacitor is connected to a ground to allow a transitional excessive current to flow down to the ground. An electronic flash connected via common terminal 12 includes a capacitor. The electronic flash causes a current accumulated in the capacitor to discharge instantaneously to emit flashlight. If a user has connected an electronic flash to common terminal 12 even though a connection to TC circuit 151 has been set, the electronic flash would therefore be likely to discharge a greater current instantaneously to switching circuit 111. In such a case, first protection circuit 153 allows a transitional excessive current to flow down to the ground to reduce an influence to switching circuit 111.

Second protection circuit 154 is connected between switching circuit 111 and TC circuit 151. Second protection circuit 154 is, specifically, as shown in FIG. 3B, achieved by Zener diodes, for example, which keeps a constant voltage to be applied to TC circuit 151.

1-3. Operation

Figure 4:
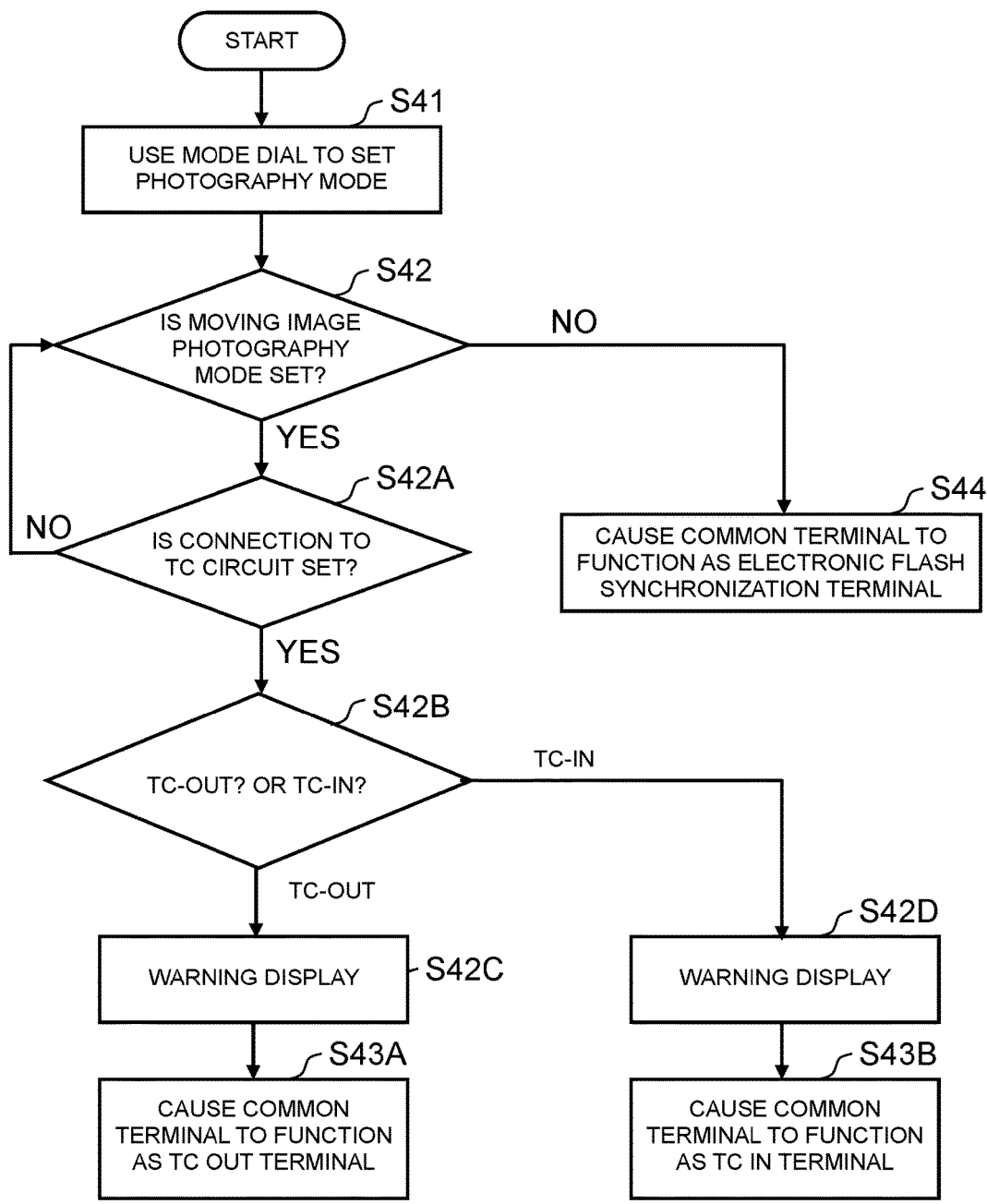
FIG. 4 is a flowchart illustrating a terminal allocation method for a common terminal of the digital camera according to the first exemplary embodiment.

Next, a terminal allocation method for common terminal 12 of the digital camera according to the first exemplary embodiment will now be described herein. FIG. 4 is a flowchart illustrating the terminal allocation method for the common terminal of the digital camera according to the first exemplary embodiment.

In step S41 in FIG. 4, a user uses mode dial 10 of operation unit 180 to select a certain photography mode from among the program AE mode, the diaphragm priority AE mode, the shutter speed priority AE mode, the manual exposure mode, and the creative moving image mode, for example. The program AE mode, the diaphragm priority AE mode, the shutter speed priority AE mode, and the manual exposure mode all are specified to a still image photography mode, according to the present disclosure. The creative moving image mode is specified to a moving image photography mode, according to the present disclosure.

In step S42, controller 130 determines a state of mode dial 10. Upon controller 130 determines that the selected mode is a first photography mode (in this exemplary embodiment, the moving image photography mode), controller 130 proceeds to step S42A. In step S42, upon controller 130 determines that the selected mode is not the moving image photography mode, in other words, that the selected mode is the still image photography mode, controller 130 proceeds to step S44.

In step S42A, controller 130 causes display unit 190 to display a menu for setting the connection to TC circuit 151. The menu for setting the connection to the TC circuit includes a menu for allowing a user to select the connection to TC circuit 151, and a menu for allowing the user to select starting of the connection to TC circuit 151. The menu for setting the connection to the TC circuit is an example menu regarding a setting for the TC circuit.

For example, in step S42A, the user first selects whether the user connects TC circuit 151, via touch panel 20 integrated with display unit 190. Upon the user selects the connection, the user then selects whether the user starts the connection, via touch panel 20. When the user has not selected the connection to TC circuit 151 in step S42A, or the user has not selected starting of the connection, controller 130 returns to step S42. In this exemplary embodiment, upon the user has selected the connection to TC circuit 151, and further has selected starting of the connection, the connection to TC circuit 151 is set. By separating a step for setting the connection to TC circuit 151 into two stages, as described above, the user will be less likely to perform an erroneous operation.

In step S42B, controller 130 causes display unit 190 to display a menu for urging the user to select whether common terminal 12 is caused to function as the TC-OUT terminal or the TC-IN terminal. This selection menu is also an example menu regarding a setting for the TC circuit. In this selection menu, a user may be able to at least select whether digital camera 100 outputs or inputs the time code signal. The user selects either of a function as the TC-OUT terminal and a function as the TC-IN terminal, via touch panel 20 integrated with display unit 190.

Upon the user selects the function as the TC-OUT terminal in step S42B, controller 130 proceeds to step S42C. Upon the user selects the function as the TC-IN terminal, controller 130 proceeds to step S42D.

In steps S42C and S42D, controller 130 causes a notification unit to provide a warning to the user. The notification unit is display unit 190, for example. The warning warns the user to not connect an electronic flash to common terminal 12. Display unit 190 displays a message "Do not connect an electronic flash to the common terminal," for example. The notification unit may be a speaker. In this case, the user may be provided with an audio warning.

After the warning is provided in step S42C, and a predetermined time has passed, switch S1 shown in FIG. 3B goes off. A photo-transistor therefore emits light, and switching circuit 111 comes on. As described above, controller 130 controls switching circuit 111 to connect common terminal 12 and FPGA 113 (step S43A). In step S43A, common terminal 12 functions as the TC-OUT terminal. In other words, upon the user performs an operation for starting capturing of a moving image, such as pressing of shutter button 13, controller 130 accepts the operation to perform a process described below. Controller 130 causes oscillator 114 and FPGA 113 to drive based on a TC-OUT setting condition set beforehand by controller 130 or the user. Controller 130 then outputs from common terminal 12 the time code signal output by FPGA 113.

On the other hand, after the warning is provided in step S42D, and a predetermined time has passed, controller 130 turns ON switching circuit 111, similar to step S43A. As described above, controller 130 controls switching circuit 111 to connect common terminal 12 and FPGA 113 (step S43B). In step S43B, common terminal 12 functions as the TC-IN terminal. In other words, upon the user performs an operation for starting capturing of a moving image, such as pressing of shutter button 13, controller 130 accepts the operation to perform a process described below. Controller 130 causes oscillator 114 and FPGA 113 to drive based on a TC-IN setting condition set beforehand by controller 130 or the user. Controller 130 then accepts, via FPGA 113, the time code signal input into common terminal 12.

In step S44, mode dial 10 is set to the still image photography mode. Upon the user performs an operation for starting capturing of a still image, such as pressing of shutter button 13, a circuit for outputting a trigger signal for causing an electronic flash to emit light (electronic flash circuit 152) is energized.

1-4. Effects (1) Digital camera 100 (an example imaging apparatus) according to this exemplary embodiment includes common terminal 12, a photography mode setting unit (mode dial 10), and function setting unit 140. The photography mode setting unit (mode dial 10) is capable of setting a certain photography mode from among the plurality of photography modes including the first photography mode (e.g., the moving image photography mode) and the second photography mode (e.g., the still image photography mode). Function setting unit 140 is configured, when the photography mode setting unit (mode dial 10) sets the certain photography mode to the first photography mode, to achieve the first function using common terminal 12. Function setting unit 140 is configured, when the photography mode setting unit (mode dial 10) sets the certain photography mode to the second photography mode, to achieve the second function using common terminal 12. Function setting unit 140 does not achieve the second function in the first photography mode. Function setting unit 140 does not achieve the first function in the second photography mode.

In other words, the second function is not used in the first photography mode, and the first function is not used in the second photography mode. Accordingly, the first function and the second function will not therefore need to be achieved simultaneously. In this exemplary embodiment, a single terminal is used as a common terminal for achieving the first function and the second function.

In this exemplary embodiment, a function only used in a certain photography mode selected from among the plurality of photography modes (the first photography mode or the second photography mode) can therefore be achieved using the common terminal.

To describe specifically, in this exemplary embodiment, as shown in FIG. 5, the second function (e.g., a function for outputting an electronic flash emitting timing) is not used in the first photography mode (the moving image photography mode). In the second photography mode (the still image photography mode), the first function (e.g., a function for inputting and outputting a time code signal) is not used. Common terminal 12 can therefore be allocated as one of the TC-IN terminal, the TC-OUT terminal, and the electronic flash synchronization terminal in accordance with the certain photography mode selected from among the plurality of photography modes (the moving image photography mode or the still image photography mode). As described above, when digital camera 100 has a plurality of photography modes that are exclusive from each other so that a function used in a photography mode will not be used in another photography mode, a terminal to be used for the function can be used for another function in another photography mode.

Conventionally, an electronic flash synchronization terminal used for synchronization with an electronic flash has not been utilized when a moving image photography mode is set. In this exemplary embodiment, such an electronic flash synchronization terminal can be utilized as a TC-IN terminal or a TC-OUT terminal. A special terminal for inputting and outputting a time code can therefore be eliminated, and a convenient function can be provided in a small-sized device without sacrificing a size and a freedom in designing of digital camera 100.

(2) The first photography mode may be the moving image photography mode, and the second photography mode may be the still image photography mode. When the photography mode setting unit (mode dial 10) sets the certain photography mode to the moving image photography mode, function setting unit 140 causes common terminal 12 to function as the synchronizing signal input terminal for moving images to achieve the first function. When the photography mode setting unit (mode dial 10) sets the certain photography mode to the still image photography mode, function setting unit 140 causes common terminal 12 to function as a trigger signal output terminal to achieve the second function.

(3) This exemplary embodiment further includes an input unit (e.g., touch panel 20) for accepting a user's input regarding a setting for the first function, after the photography mode setting unit (mode dial 10) sets the certain photography mode to the moving image photography mode, and before function setting unit 140 causes common terminal 12 to function as at least either of the synchronizing signal input terminal and the synchronizing signal output terminal for moving images to achieve the first function.

Specifically, for example, as shown in FIG. 4, after step S42 (setting of the moving image photography mode), at least either of step S42A (setting of the connection to the TC circuit) and step S42B (selection of the TC-IN terminal or the TC-OUT terminal) is executed.

In this exemplary embodiment, a user can therefore be warned that the first function will be achieved before a circuit for achieving the first function (the first circuit, i.e., TC circuit 151) is energized. Connecting an electronic flash to common terminal 12 by the user even though the moving image photography mode has been set can therefore be refrained. The user will be able to easily know that the user has erroneously set the moving image photography mode even though an electronic flash is connected to common terminal 12.

(4) In this exemplary embodiment, an input regarding a setting for the first function includes a user's selection of whether common terminal 12 is caused to function as either of the synchronizing signal input terminal (the TC-IN terminal) and the synchronizing signal output terminal (the TC-OUT terminal) for moving images. In other words, in this exemplary embodiment, after step S42, step S42B (selection of the TC-IN terminal or the TC-OUT terminal) is executed.

In this exemplary embodiment, controller 130 can therefore determine whether digital camera 100 inputs or outputs the time code signal. Since the user will can be warned that the first function will be achieved, connecting an electronic flash to common terminal 12 by the user even though the moving image photography mode is set can be refrained. The user will be able to easily know that the user has erroneously set the moving image photography mode even though an electronic flash is connected to common terminal 12.

(5) Digital camera 100 according to this exemplary embodiment further includes a notification unit (e.g., display unit 190) for providing a warning to a user after the photography mode setting unit (mode dial 10) sets the certain photography mode to the moving image photography mode, and before function setting unit 140 causes common terminal 12 to function as either of the synchronizing signal input terminal and the synchronizing signal output terminal for moving images to achieve the first function. In other words, after step S42 in FIG. 4, step S42C or step S42D is executed. The warning may at least warn a user that the first function will be achieved. A content of the warning indicating that the first function will be achieved is, for example, a message "Please connect the TC generator or another camera." The content of the warning indicating that the first function will be achieved includes a content of a warning indicating that the second function will not be achieved. Specifically, for example, the content may be a message "Do not connect an electronic flash."

According to this exemplary embodiment, connecting an electronic flash to common terminal 12 by a user even though the moving image photography mode is set can therefore be refrained. The user will be able to easily know that the user has erroneously set the moving image photography mode even though an electronic flash is connected to common terminal 12.

(6) In this exemplary embodiment, function setting unit 140 includes the first circuit (e.g., TC circuit 151), the second circuit (e.g., electronic flash circuit 152), the changeover circuit (e.g., switching circuit 111), and the protection circuit (e.g., first protection circuit 153). The first circuit (TC circuit 151) is connected to common terminal 12 to achieve the first function. The second circuit (electronic flash circuit 152) is connected to common terminal 12 to achieve the second function. The changeover circuit (switching circuit 111) performs ON/OFF switching of the connection between common terminal 12 and the first circuit (TC circuit 151). The protection circuit (first protection circuit 153) is connected between common terminal 12 and the changeover circuit (switching circuit 111).

In this exemplary embodiment, if an electronic flash is connected to common terminal 12 even though the moving image photography mode is set, and if a greater current flows from the electronic flash to switching circuit 111, the excessive current can therefore be discharged to the ground by the protection circuit before the current reaches switching circuit 111.

Other Exemplary Embodiments

As described above, the first exemplary embodiment has been described to exemplify a technique disclosed in the present application. However, the technique in the present disclosure is not limited to this, and can also be applied to an exemplary embodiment in which modification, replacement, addition, omission, or the like is performed appropriately. In addition, a new exemplary embodiment can be made by combining constituents described in the above first exemplary embodiment.

The above exemplary embodiment has described an example in which the imaging apparatus of the present disclosure is applied to the interchangeable lens type digital camera, but the imaging apparatus of the present disclosure can be applied also to a digital camera in which a lens and a body are integral.

The above exemplary embodiment has described that the first function according to the present disclosure is inputting and outputting of a time code. However, the first function is not limited to this function. For example, the first function may be inputting of a time code only, outputting of a time code only, inputting and outputting of GENERATOR LOCKING (GENLOCK), inputting of GENLOCK only, or outputting of GENLOCK only. The synchronizing signal input terminal according to the present disclosure may be a GENLOCK input terminal, and the synchronizing signal output terminal may be a GENLOCK output terminal.

The first function may be either of inputting and outputting of a microphone audio signal. In this case, a microphone is attached externally to common terminal 12. The microphone is used in the moving image photography mode, but is not used in the still image photography mode. The electronic flash synchronization terminal used in the still image photography mode can therefore be shared by the microphone. Many imaging apparatuses are originally disposed with a microphone terminal. Even in such a case, by sharing an electronic flash synchronization terminal, a plurality of microphones can be connected, which contributes to user convenience.

The above exemplary embodiment has exemplified mode dial 10 as the photography mode setting unit. However, a push button may be used. Alternatively, the photography mode setting unit may be achieved by display unit 190 and touch panel 20, for example. In other words, display unit 190 may be able to display a photography mode menu that can be selected using touch panel 20. Alternatively, the photography mode setting unit may be achieved by display unit 190 and the push button, for example.

An imaging apparatus according to the present disclosure is applicable to electronic devices (e.g., video cameras and integrated circuit (IC) recorders) that achieve a certain function using a common terminal in accordance with a photography mode selected from among a plurality of photography modes.

What is claimed is:

1. An imaging apparatus comprising:
   a common terminal;
   a photography mode setting unit capable of setting a certain photography mode from among a plurality of photography modes including a photography mode for a moving image and a photography mode for a still image, wherein the photography mode setting unit is configured independently from the common terminal; and
   a function setting unit configured:
      when the photography mode setting unit sets the certain photography mode to the photography mode for the moving image to achieve a first function using the common terminal and to not achieve a second function, the function setting unit causes the common terminal to function as either of a synchronizing signal input terminal for the moving image or a synchronizing signal output terminal for the moving image, wherein:
         when the common terminal functions as the synchronizing signal input terminal, the common terminal is configured to receive as an input an external synchronizing signal for synchronizing image captured by the imaging apparatus with the external synchronizing signal; and
         when the common terminal functions as the synchronizing signal output terminal, the common terminal is configured to send out, as an output, an external synchronizing signal for synchronizing image captured by other imaging apparatus with the external synchronizing signal,
      when the photography mode setting unit sets the certain photography mode to the photography mode for the still image to achieve the second function using the common terminal and to not achieve the first function, the function setting unit causes the common terminal to function as a trigger signal output terminal for causing an electronic flash to emit light.

2. The imaging apparatus according to claim 1, further comprising an input unit for accepting a user's input regarding a setting for the photography mode for the moving image and before the function setting unit achieves the first function.

3. The imaging apparatus according to claim 2, wherein the input regarding the setting for the first function includes a user's selection of whether the common terminal is caused to function as either of the synchronizing signal input terminal and the synchronizing signal output terminal for the moving image.

4. The imaging apparatus according to claim 1, further comprising a notification unit for providing a warning to a user after the photography mode setting unit sets the certain photography mode to the photography mode for the moving image, and before the function setting unit achieves the first function.

5. The imaging apparatus according to claim 1, wherein the function setting unit includes:
   a first circuit connected to the common terminal to achieve the first function;
   a second circuit connected to the common terminal to achieve the second function;
   a changeover circuit that performs ON/OFF switching of a connection between the common terminal and the first circuit; and
   a protection circuit connected between the common terminal and the changeover circuit.

* * * * *